United States Patent
Kim et al.

(10) Patent No.: US 8,310,951 B2
(45) Date of Patent: Nov. 13, 2012

(54) NETWORK CODING METHOD AND SYSTEM THROUGH CONSIDERATION OF CHANNEL STATE DIFFERENCE OF RECEIVERS

(75) Inventors: Young Han Kim, Seoul (KR); Hyo Gon Kim, Seoul (KR); Sang Ki Yun, Seoul (KR)

(73) Assignees: MMC Technology, Inc., Seoul (KR); Soongsil University Research Consortium Techno-Park, Seoul (KR)

( * ) Notice: Subject to any disclaimer, the term of this patent is extended or adjusted under 35 U.S.C. 154(b) by 330 days.

(21) Appl. No.: 12/708,723

(22) Filed: Feb. 19, 2010

(65) Prior Publication Data

US 2011/0182379 A1 Jul. 28, 2011

(30) Foreign Application Priority Data

Jan. 28, 2010 (KR) .................. 10-2010-0007997

(51) Int. Cl.
*H04J 3/22* (2006.01)
(52) U.S. Cl. ........ 370/252; 370/312; 370/390; 370/432; 370/468
(58) Field of Classification Search .................. 370/252, 370/253, 312, 390, 432
See application file for complete search history.

(56) References Cited

U.S. PATENT DOCUMENTS

| | | | | |
|---|---|---|---|---|
| 2008/0247407 | A1* | 10/2008 | Westphal et al. | 370/406 |
| 2008/0267168 | A1* | 10/2008 | Cai et al. | 370/352 |

* cited by examiner

*Primary Examiner* — Pao Sinkantarakorn

(57) ABSTRACT

Disclosed is a network coding method and system for receivers having a different channel state that may demodulate and extract a single coded packet using a different demodulation scheme according to a channel state of each receiver. The disclosed network coding method may use a different demodulation scheme to be suitable for a channel state of each receiver by applying a packet encoding scheme combined with a modulation scheme. When two receivers receive a network coded packet, a receiver having a poor channel state may receive a relatively small amount of information from the single packet compared to the other receiver having a relatively excellent channel state, but may enhance the reliability of packet reception. The other receiver having the relatively excellent channel state may decrease the reliability of packet reception, but may receive a relatively large amount of information.

9 Claims, 4 Drawing Sheets

When bit of $C_2$ is invalid

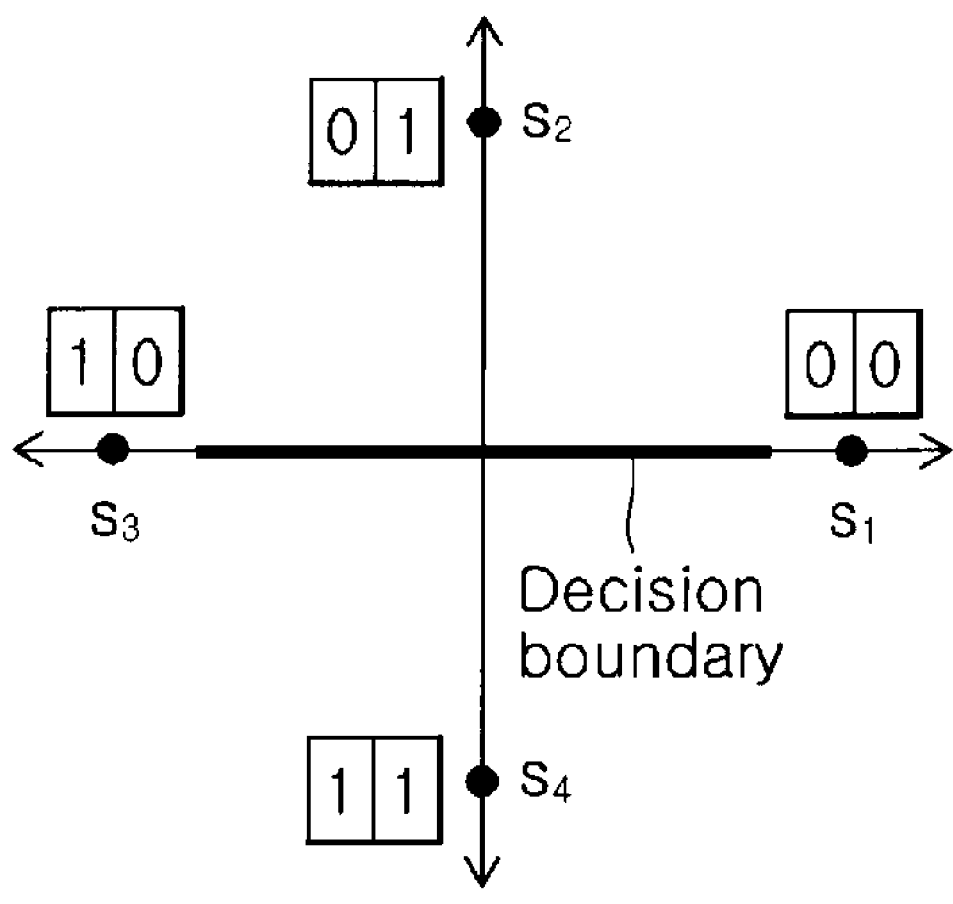

NETWORK CODING METHOD AND SYSTEM THROUGH CONSIDERATION OF CHANNEL STATE DIFFERENCE OF RECEIVERS

CROSS-REFERENCE TO RELATED APPLICATION

This application claims the benefit of Korean Patent Application No. 10-2010-0007997, filed on Jan. 28, 2010, in the Korean Intellectual Property Office, the disclosure of which is incorporated herein by reference.

BACKGROUND

1. Field of the Invention

The present invention relates to a network coding method and system, and more particular, to a network coding method and system that may differentiate the reliability of data reception and an amount of received data for each single packet with respect to each of receivers having a different channel state, in order to solve a bottleneck phenomenon of packet relay when data packets are transmitted and received between a plurality of transmitters and a plurality of receivers in a wireless communication environment.

2. Description of the Related Art

A network coding technology may enhance communication efficiency by preventing a bottleneck phenomenon in a wireless multi-hop network where a plurality of communication equipments is wirelessly connected to each other. In network coding, packet encoding may be performed by relay nodes that function to transfer a packet in a situation where a pair of nodes mutually transmit and receive data.

FIG. 1A is a diagram for describing a case where network coding is not used in a wireless multi-hop network where two nodes transmit and receive data via a single relay node according to a related art, and FIG. 1B is a diagram for describing a case where the network coding scheme is used in the wireless multi-hop network where two nodes transmit and receive data via the single relay node according to the related art.

Hereinafter, the case where the network coding scheme is used in the wireless multi-hop network where three wireless nodes, for example, a node A, a node R, and a node B, are arranged in a line will be compared with the case where the network coding scheme is not used with reference to FIGS. 1A and 1B. As shown in FIG. 1A, when the network coding scheme is not used, the node A transmits a packet 1 to the node B via the node R. The node B also transmits a packet 2 to the node A via the node R. A total of four times of packet transmissions may be required to transmit two packets 1 and 2, that is, so that the node A may transmit the packet 1 and the node B may transmit the packet 2 using the scheme of FIG. 1A.

As shown in FIG. 1B, when the network coding scheme is used, the nodes A and B may store the packets 1 and 2 transmitted by the nodes A and B, respectively, without discarding them. Instead of transmitting the packets 1 and 2 received from the nodes A and B as is, the node R may perform an exclusive OR (XOR) of the received packets 1 and 2 to encode the packets 1 and 2 into a single packet 1⊕2 and then transmit the encoded packet 1⊕2 to the nodes A and B at a one time. The node A may perform decoding by performing an XOR operation of the received encoded packet 1⊕2 and the packet 1 transmitted by the node A, that is, (1⊕2)⊕1, and thereby may extract the packet 2 that the node A desires to receive. Similarly, the node B may decode the packet 1 from the encoded packet 1⊕2 using the packet 2 transmitted by the node B. As described above, compared to the case where the network coding scheme is not used, when the network coding scheme is used, a total number of packet transmissions may be reduced from four times to three times.

In a digital communication, a process of transforming, to an electrical signal, bits of a packet to be transmitted by a transmitter corresponds to modulation. A process of decoding a received signal to a bit corresponds to demodulation. In a wireless communication environment, a channel state may be diversified based on a distance between communicators. Accordingly, when the channel state is excellent, it is possible to enhance a physical transmission rate by employing a high modulation scheme using a large number of transmission bits per symbol. On the other hand, when the channel state is poor and thus a signal-to-noise ratio (SNR) is low, it is possible to decrease a transmission rate, and to enhance data reliability by employing a low modulation scheme using a small number of transmission bits per symbol. Generally, a binary phase shift keying (BPSK) modulation scheme, a quadrature phase shift keying (QPSK) modulation scheme, a quadrature amplitude modulation (QAM) scheme, and the like may be applicable to widely used Wireless Local Area Network (WLAN) communication technologies such as an Institute of Electrical and Electronics Engineers (IEEE) 802.11 standard.

FIG. 2A is a diagram illustrating a signal space to describe a BPSK operation scheme, and FIG. 2B is a diagram illustrating a signal space to describe a QPSK operation scheme.

In the case of a BPSK scheme shown in FIG. 2A, a single symbol includes two signals points $S_1$ 211 and $S_2$ 212 and thus a single bit is transmitted per symbol. In the case of a QPSK scheme shown in FIG. 2B, a single symbol includes four signal points $S_1$, $S_2$, $S_3$, and $S_4$ and thus two bits are transmitted per symbol. A modulated signal as above may be distorted due to noise and interference occurring when the modulated signal is transmitted from a transmitter via a wireless channel. A receiver may perform demodulation to predict which symbol is transmitted from the transmitter. A demodulation scheme generally uses a Maximum Likelihood (ML) scheme of recognizing a signal point nearest to a received signal as a signal transmitted from the transmitter.

For example, in the BPSK scheme shown in FIG. 2A, when the received signal is positioned on the right of a decision boundary 210, the received signal may be decoded to "zero" with the assumption that an original signal transmitted from the transmitter is $S_1$ 211. When the received signal is positioned on the left of the decision boundary 210, the received signal may be decoded to "1" with the assumption that the original signal transmitted from the transmitter is $S_2$ 212.

Similarly, in the QPSK scheme shown in FIG. 2B, a signal point nearest to the received signal may be recognized as a signal transmitted from the transmitter using the ML scheme. In this example, since four signal points $S_1$, $S_2$, $S_3$, and $S_4$ transmittable by the transmitter exist, a distance between the signal points $S_1$, $S_2$, $S_3$, and $S_4$ may become shorter. Compared to the BPSK scheme, the reliability of the received signal at the same SNR may be deteriorated. However, since two bits may be transmitted per signal, the QPSK scheme may achieve twice bandwidth efficiency compared to the BPSK scheme.

As described above, the network coding scheme may encode multiple packets in a node corresponding to the bottleneck phenomenon of packet relay, and may collectively broadcast the encoded packets to a plurality of nodes. Accordingly, it is possible to reduce a number of packets to be transmitted, whereas it is impossible to perform modulation in consideration of a channel state of each individual user. In a general wireless communication, a modulation scheme such as a QAM modulation scheme, a QPSK modulation scheme, and the like may be selectively used. However, when broadcasting an encoded packet using the network coding scheme, a plurality of users may need to receive the broadcast encoded packet and thus it is impossible to use a modulation scheme suitable for each of the users. Accordingly, the general existing network coding scheme may need to transmit the encoded packet using a lowest modulation allowed by a communication standard. In this case, it may cause some damage to receivers having a good channel state among the plurality of users.

SUMMARY

An aspect of the present invention provides a network coding method and system that may encode a packet and broadcast the encoded packet so that the reliability of data reception and an amount of received data for each single packet with respect to each of receivers having a different channel state may be differentiated in order to solve a bottleneck phenomenon of packet relay when data packets are transmitted and received between a plurality of transmitters and a plurality of receivers in a wireless communication environment.

According to an aspect of the present invention, there is provided a network coding method including: receiving, by a transmitter, a report about information associated with a channel state from a plurality of receivers; broadcasting, by the transmitter, a packet to receivers having a different channel state among the plurality of receivers; and demodulating and decoding, by each of the receivers receiving the broadcast packet, the broadcast packet using a different demodulation scheme.

In the broadcasting, the packet may be broadcast using the same modulation scheme. In the demodulating and the decoding, a second receiver having an excellent channel state compared to a first receiver may demodulate the packet using a second demodulation scheme, and the first receiver may demodulate the packet using a first demodulation scheme having a narrow bandwidth compared to the second demodulation scheme.

The first demodulation scheme corresponds to one of a binary phase shift keying (BPSK) demodulation scheme, a quadrature phase shift keying (QPSK) demodulation scheme, and a quadrature amplitude modulation (QAM) demodulation scheme. The second demodulation scheme corresponds to a demodulation scheme having a wide bandwidth compared to the first demodulation scheme among the BPSK demodulation scheme, the QPSK demodulation scheme, and the QAM demodulation scheme.

Prior to the broadcasting, the network coding method may include receiving a packet a from a first receiver and receiving a packet b from a second receiver. The broadcasting may include encoding the packet using an exclusive OR (XOR) operation of the packet a and the packet b, and broadcasting the encoded packet to the first receiver and the second receiver, After the broadcasting, the network coding method may include demodulating, by the second receiver having an excellent channel state compared to the first receiver, the encoded packet using a second demodulation scheme and decoding the demodulated packet using the packet b to extract the packet a.

After the broadcasting, the network coding method may include demodulating, by the first receiver having a poor channel state compared to the second receiver, the encoded packet using a first demodulation scheme having a narrow bandwidth compared to the second demodulation scheme, and decoding the demodulated packet using the packet a to extract the packet b.

According to another aspect of the present invention, there is provided a network coding system including: a transmitter to receive, from a plurality of receivers, a report about information associated with a channel state, and to broadcast a packet to the plurality of receivers. The transmitter may include a broadcasting unit to broadcast the packet to receivers having a different channel state among the plurality of receivers. Each of the receivers receiving the broadcast packet may demodulate and decode the broadcast packet using a different demodulation scheme.

The broadcasting unit may broadcast the packet using the same modulation scheme. A second receiver having an excellent channel state compared to a first receiver may demodulate the packet using a second demodulation scheme, and the first receiver may demodulate the packet using a first demodulation scheme having a narrow bandwidth compared to the second demodulation scheme.

The transmitter may include: a reception unit to receive a packet a from a first receiver, and to receive a packet b from a second receiver; and an encoding unit to encode the packet using an XOR operation of the packet a and the packet b. The broadcasting unit may broadcast the encoded packet to the first receiver and the second receiver.

The second receiver having an excellent channel state compared to the first receiver may demodulates the encoded packet using a second demodulation scheme and decode the demodulated packet using the packet b to extract the packet a. The first receiver having a poor channel state compared to the second receiver may demodulate the encoded packet using a first demodulation scheme having a narrow bandwidth compared the second demodulation scheme, and decode the demodulated packet using the packet a to extract the packet b.

EFFECT

According to a network coding method and system of the present invention, when data packets are transmitted and received between a plurality of transmitters and a plurality of receivers in a wireless communication environment, it is possible to enhance broadcasting efficiency compared to an existing network coding scheme by applying a coding scheme based on a channel state difference of receivers. In addition, it is possible to solve a bottleneck phenomenon of packet relay. In the existing coding scheme, a single encoded packet may give a single packet to each receiver. However, in the network coding method according to the present invention, a receiver having an excellent channel state may receive a plurality of packets from a single encoded packet.

For example, in examples of FIGS. 1 and 2, when a channel state of the node A is poor compared to the node B, a packet may be broadcast so that a binary shift phase keying (BSPK) demodulation scheme may be applied to the node A and a quadrature phase shift keying (QPSK) demodulation scheme may be applied to the node B. In this instance, within the same symbol, the node A may receive only a single bit per symbol at high reliability according to the BPSK demodulation scheme. The node B may receive two bits per symbol at low reliability according to the QPSK demodulation scheme.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 5B is a diagram illustrating an example of demodulating a packet by a receiver having an excellent channel state in a packet receiving situation according to an embodiment of the present invention.

DETAILED DESCRIPTION

Figure 1A:
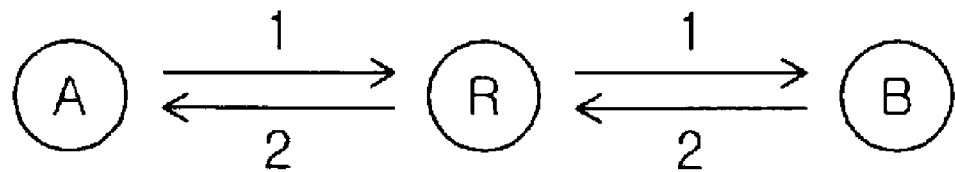
FIG. 1A is a diagram for describing a case where a network coding scheme is not used in a wireless multi-hop network where two nodes transmit and receive data via a single relay node according to a related art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 3:
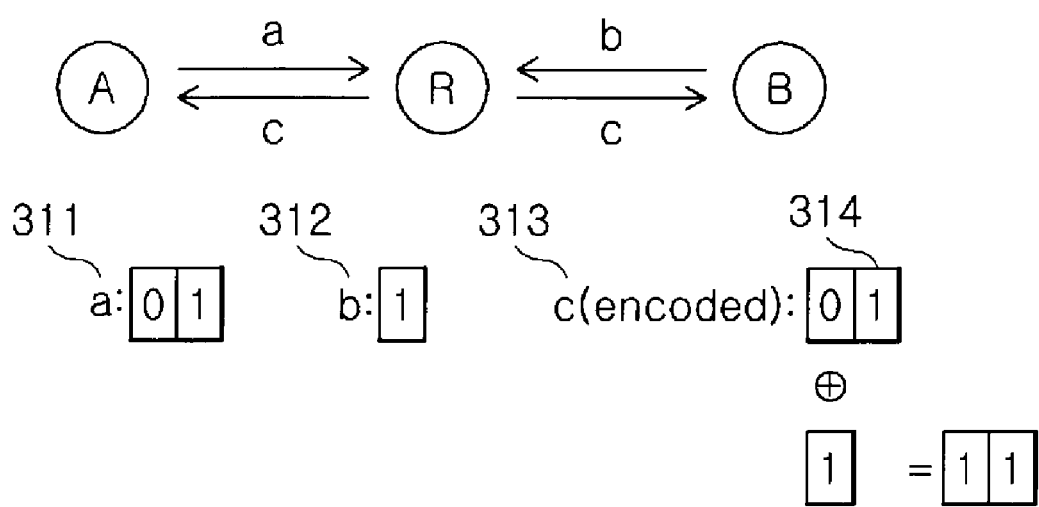
FIG. 3 is a diagram for describing a network coding method in a network system according to an embodiment of the present invention.

FIG. 3 is a diagram for describing a network coding method in a network system according to an embodiment of the present invention.

Referring to FIG. 3, the network system includes a plurality of receivers A and B and a transmitter R. The plurality of receivers A and B corresponds to nodes indicating user terminals such as a wired/wireless communication apparatus to mutually transmit and receive a packet. For example, the receivers A and B may include portable devices such as a cellular phone, a Personal Communications Services (PCS) phone, a synchronous/asynchronous International Mobile Telecommunication (IMT)-2000, a Personal Digital Assistant (PDA), a smart phone, a wireless application protocol (WAP) phone, a mobile play station, and a Portable Multimedia Player (PMP), and may also include mobile communication networks such as a notebook personal computer (PC), a desktop PC, and a palm PC, and other various types of home or company electronic devices receiving wired/wireless communication services via various connection networks such as wireless Internet. The transmitter R corresponds to a node of relaying a packet transmission between the receivers A and B. The transmitter R may include various types of access points accessed by a base station such as a mobile communication network and the wireless Internet, or by the receivers A and B in order to receive a communication relay.

Figure 1B:
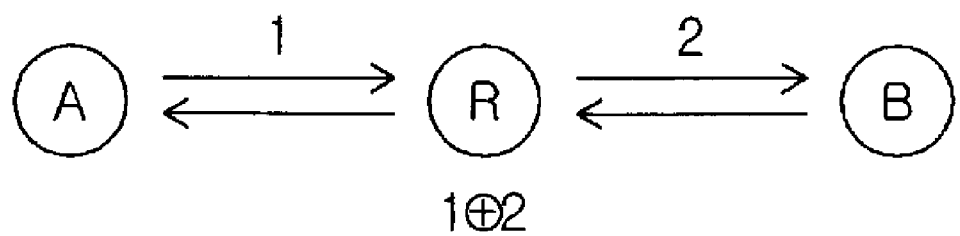
FIG. 1B is a diagram for describing a case where the network coding scheme is used in the wireless multi-hop network where two nodes transmit and receive data via the single relay node according to the related art.

In the network system according to an embodiment of the present invention, network coding may be performed. For example, as described above with reference to FIG. 1B, the receivers A and B may store packets a and b transmitted by the receivers A and B, respectively, without discarding them. Instead of transmitting the packets a and b received from the receivers A and B as is, the transmitter R may perform an exclusive OR (XOR) of the received packets a and b to encode the packets a and b into a single packet a⊕b and then transmit the encoded packet a⊕b to the receivers A and B at a one time. The receiver A may perform decoding by performing an XOR operation of the received encoded packet a⊕b and the packet a transmitted by the receiver A, that is, (a⊕b)⊕a, and thereby may extract the packet b that the receiver A desires to receive. Similarly, the receiver B may decode the packet a from the encoded packet a⊕b using the packet b transmitted by the transmitted by the receiver B.

In particular, according to an embodiment of the present invention, the transmitter R may receive, from the receivers A and B, a report about information associated with a channel state. For example, when each of the receivers A and B gathers information such as power or a signal-to-noise ratio (SNR) of a using channel, and transmits the gathered information to the transmitter R, the transmitter R may broadcast a packet to receivers having a different channel state among the plurality of receivers A and B according to the same modulation scheme. Each of the receivers receiving the broadcast packet may demodulate and decode the packet using a different demodulation scheme and thus may have differential bandwidth efficiency and packet reception performance.

For example, when each of the receivers A and B has a different channel state, and when a broadcasting unit of the transmitter R transmits a packet to the plurality of receivers A and B using the same modulation scheme, for example, a quadrature phase shift keying (QPSK) modulation scheme, the receiver B having an excellent channel state compared to the receiver A may demodulate the packet using a QPSK demodulation scheme and the receiver A may demodulate the packet using a binary phase shift keying (BPSK) demodulation scheme having a narrow bandwidth compared to the QPSK demodulation scheme. This is only an example and thus the receiver A may demodulate the packet using one of the BPSK demodulation scheme, the QPSK demodulation scheme, a quadrature amplitude modulation (QAM) demodulation scheme, and the like, and the receiver B may demodulate the corresponding packet using a different demodulation scheme having a relatively wide bandwidth compared to the demodulation scheme of the receiver A.

Referring to FIG. 3, it is assumed that a reception unit of the transmitter R receives, from the receiver A, a packet a 311 containing two-bit information "01", and receives, from the receiver B, a packet b 312 containing one-bit information "1". Here, it is also assumed that a channel state of the receiver B is excellent compared to the receiver A.

In this example, an encoding unit of the transmitter R may performing encoding by performing an XOR operation of the packet a 311 and the packet b 312 a⊕b, and a broadcasting unit may broadcast the encoded packet a⊕b to the receivers A and B using the same modulation scheme, for example, a QPSK modulation scheme.

Figure 4:
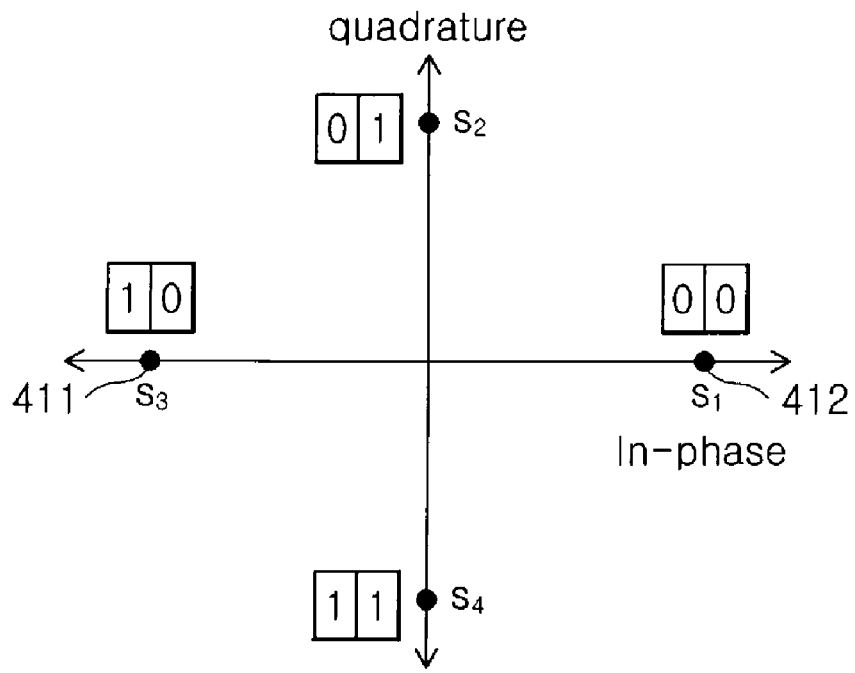
FIG. 4 is a diagram illustrating an example of a modulation scheme in a physical layer of an encoded packet according to an embodiment of the present invention.

The encoding unit of the transmitter R may perform encoding by performing the XOR operation for every two bits of the packet a 311 and each single bit of the packet b 312. For example, the encoding unit may perform the XOR operation for "01" of the packet a 311 and "10" in which "0" is added to "1" of the packet b 312 and thereby enable "11" to be included in an encoded packet c 313. As described above, an encoded packet may be broadcast to the receivers A and B using the same modulation scheme, for example, the QPSK modulation scheme. For example, as shown in FIG. 4, according to per-bit symbol mapping on signal space coordinates including an in-phase axis and a quadrature axis, the encoded packet may be modulated in a physical layer using the QPSK modulation scheme and be broadcast to the receivers A and B.

Figure 5A:
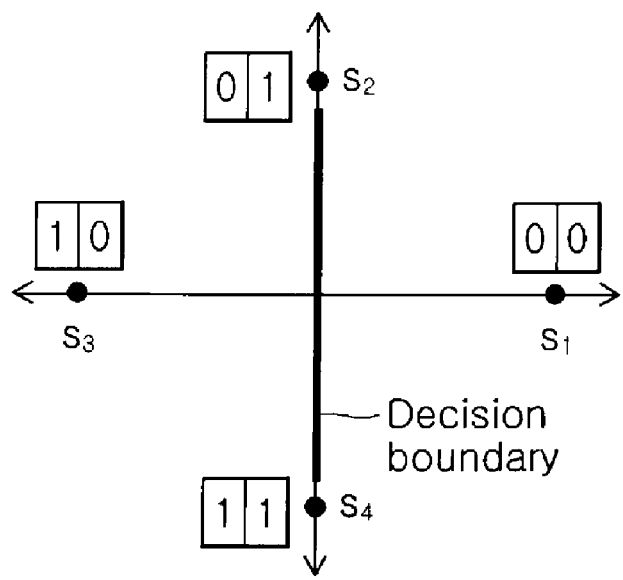
FIG. 5A is a diagram illustrating an example of demodulating a packet by a receiver having a poor channel state in a packet receiving situation according to an embodiment of the present invention.

FIG. 5A is a diagram illustrating an example of demodulating a packet by a receiver, for example, the receiver A of FIG. 3, having a poor channel state in a packet receiving situation according to an embodiment of the present invention.

Figure 2A:
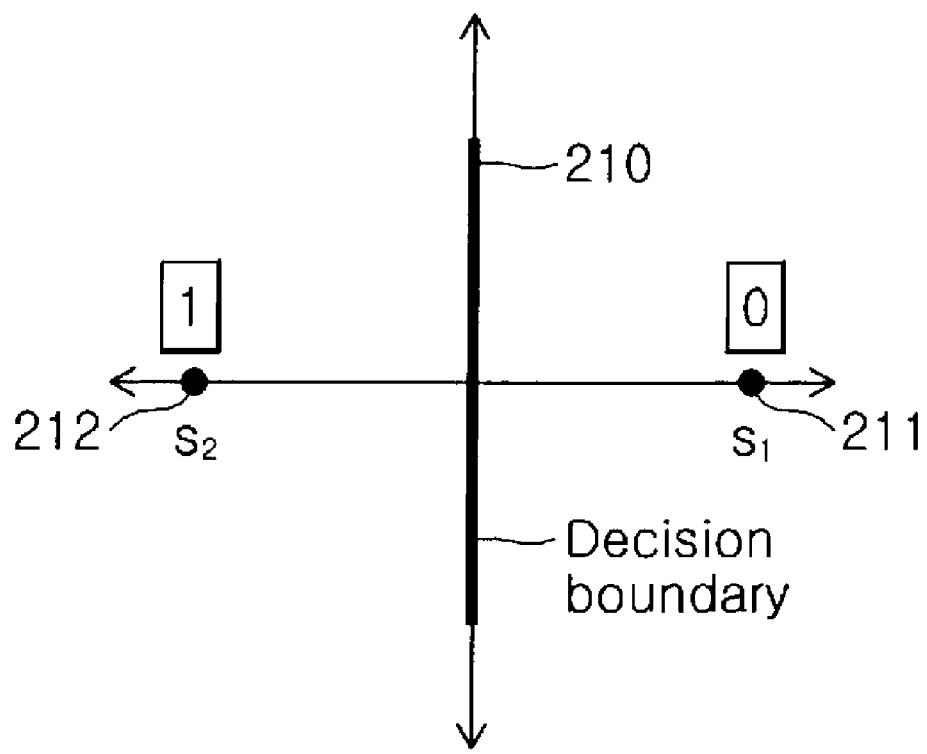
FIG. 2A is a diagram illustrating a signal space to describe a binary phase shift keying (BPSK) operation scheme.

The receiver A may be aware that a second bit $c_2$ 314 among encoded bits "11" ($c_1$, $c_2$) contained in the packet c 313 of FIG. 3 corresponds to invalid information. The receiver A may perform demodulation using a demodulation scheme having a low bandwidth, for example, a BPSK demodulation scheme in a poor channel state. Specifically, since the second bit $c_2$ 314 among the encoded bits ($c_1$, $c_2$) corresponds to insignificant invalid data, the receiver A may recognize in advance that the packet broadcast by the transmitter R is $S_1$ 412 or $S_3$ 411 of FIG. 4. In this case, a decision range for a bit decision during a demodulation process may correspond to a more similar side between both sides of a decision boundary as indicated by an arrow 511. For example, a side of "10" may be selected as a final reception packet according to an ML scheme. Accordingly, as in FIG. 2A, a demodulation performance here may be maintained to be the same as a performance of the BPSK demodulation scheme. Specifically, the receiver A may perform demodulation using the BPSK demodulation scheme to extract the encoded packet "11" ($c_1$, $c_2$), and may perform decoding by performing an XOR operation of the demodulated packet and the packet a ("01") 311 transmitted by the receiver A, (a⊕b)⊕a. Consequently, the receiver A may ignore the second bit $c_2$ 314 from "10" and take only a first bit to thereby extract the packet b ("1") 312 transmitted from the receiver B.

FIG. 5B is a diagram illustrating an example of demodulating a packet by a receiver, for example, the receiver B of FIG. 3, having an excellent channel state in a packet receiving situation according to an embodiment of the present invention.

Figure 2B:
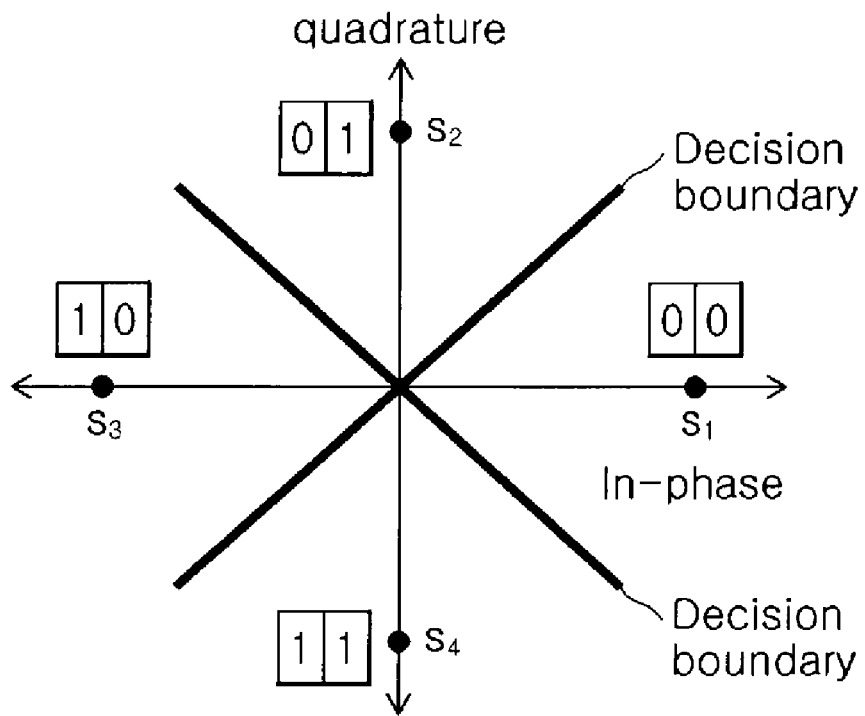
FIG. 2B is a diagram illustrating a signal space to describe a quadrature phase shift keying (QPSK) operation scheme.

The receiver B may be aware that even the second bit $c_2$ 314 among the encoded bits "11" ($c_1$, $c_2$) contained in the packet c 313 of FIG. 3 is valid. The receiver B may perform demodulation using a demodulation scheme having a high bandwidth, for example, a QPSK demodulation scheme in an excellent channel state. Specifically, since the second bit $c_2$ 314 among the encoded bits "11" ($c_1$, $c_2$) corresponds to valid data, the receiver B may recognize in advance that the packet broadcast by the transmitter R is $S_2$ or $S_4$ of FIG. 4. In this case, a decision range for a bit decision during a demodulation process may correspond to a more similar side between both sides of a decision boundary as indicated by an arrow 512. For example, a side of "01" may be selected as a final reception packet according to an ML scheme. Specifically, as in FIG. 2B, a demodulation performance here may be maintained to be the same as a performance of the QPSK demodulation scheme and thus two bits may be obtained per symbol. The receiver B may perform demodulation using the QPSK demodulation scheme to extract the encoded packet "11" ($c_1$, $c_2$), and may perform decoding by adding "0" to the packet b "1" 312 transmitted by the receiver B, and by performing an XOR operation a⊕b of the demodulated packet and the packet b. Consequently, the receiver B may extract the packet a ("01") 311 transmitted from the receiver A.

Accordingly, the receivers A and B may obtain a different number of bits from a single type symbol broadcast from the transmitter by employing a different demodulation performance.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A network coding method comprising:
   receiving, by a transmitter, a report including information associated with a channel state from a plurality of receivers;
   broadcasting, by the transmitter, a broadcast packet to at least a first receiver and a second receiver that have different channel states from each other; and
   demodulating and decoding, by the first and second receivers, the broadcast packet using different demodulation schemes,
   wherein the broadcast packet is broadcast to the first and second receivers using the same modulation scheme, and
   wherein, in the demodulating and the decoding, the first receiver demodulates the broadcast packet using a first demodulation scheme and the second receiver, which has a channel state better than that of the first receiver, demodulates the broadcast packet using a second demodulation scheme, the first demodulation scheme having a narrower bandwidth than a bandwidth of the second demodulation scheme.

2. The network coding method of claim 1, wherein
   the first demodulation scheme comprises any of a binary phase shift keying (BPSK) demodulation scheme, a quadrature phase shift keying (QPSK) demodulation scheme, and a quadrature amplitude modulation (QAM) demodulation scheme, and
   wherein the second demodulation scheme comprises a demodulation scheme having a wider bandwidth than a bandwidth of the first demodulation scheme and comprises any of the BPSK demodulation scheme, the QPSK demodulation scheme, and the QAM demodulation scheme.

3. The network coding method of claim 1, further comprising:
   receiving a first packet from the first receiver and receiving a second packet from the second receiver prior to the broadcasting,
   wherein the broadcasting comprises performing an exclusive OR (XOR) operation on the first packet and the second packet to encode the first and second packets into the broadcast packet before broadcasting the broadcast packet to the first receiver and the second receiver.

4. The network coding method of claim 3, wherein the demodulating and decoding comprises:
   demodulating, by the second receiver, the broadcast packet using the second demodulation scheme and decoding the demodulated packet using the second packet to extract the first packet.

5. The network coding method of claim 3, wherein the demodulating and decoding comprises:
   demodulating, by the first receiver, the broadcast packet using the first demodulation scheme, and decoding the demodulated packet using the first packet to extract the second packet.

6. A network coding system comprising:
   a transmitter configured to receive, from a plurality of receivers, a report including information associated with a channel state, and to broadcast a broadcast packet to at least a first receiver and a second receiver, among the plurality of receivers, using the same modulation scheme, the first and second receivers having different channel states, wherein the first receiver is configured to demodulate the broadcast packet using a first demodulation scheme, and the second receiver, which has a channel state better than that of the first receiver, is configured to demodulate the broadcast packet using a second demodulation scheme, the first demodulation scheme having a narrower bandwidth than a bandwidth of the second demodulation scheme.

7. The network coding system of claim 6, wherein the transmitter comprises:

a reception unit configured to receive a first packet from the first receiver, and to receive a second packet from the second receiver;

an encoding unit configured to perform an XOR operation on the first and second packets to encode the first and second packets into the broadcast packet; and a broadcasting unit configured to broadcast the broadcast packet to the first receiver and the second receiver.

8. The network coding system of claim 7, wherein the second receiver is configured to demodulate the broadcast packet using the second demodulation scheme and decode the demodulated packet using the second packet to extract the first packet.

9. The network coding system of claim 7, wherein the first receiver is configured to demodulate the broadcast packet using the first demodulation scheme and decode the demodulated packet using the first packet to extract the second packet.

* * * * *